United States Patent [19]

Suzuki

[11] Patent Number: 6,092,157
[45] Date of Patent: *Jul. 18, 2000

[54] PROCESSING METHOD, APPARATUS AND SYSTEM FOR MEMORY MANAGEMENT USING SHARED MEMORIES WITH COMMON DATA AREAS

[75] Inventor: Shigeo Suzuki, Yokohama, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/675,414

[22] Filed: Jul. 2, 1996

[30] Foreign Application Priority Data

Jul. 11, 1995 [JP] Japan ................................. 7-174784

[51] Int. Cl.⁷ ....................................... G06F 13/00
[52] U.S. Cl. ......................... 711/147; 709/216; 711/148; 711/209
[58] Field of Search ..................... 711/147, 148, 711/119, 209; 395/200.42, 200.43, 200.44, 200.46; 709/212, 213, 214, 216

[56] References Cited

U.S. PATENT DOCUMENTS 5,136,500  8/1992  Lemay et al. .......................... 709/216
5,613,068  3/1997  Gregg et al. ........................... 709/216

*Primary Examiner*—Glenn Gossage
*Attorney, Agent, or Firm*—Fitzpatrick, Cella, Harper & Scinto

[57] ABSTRACT

An information processing system using a plurality of nodes is disclosed, in which each of the nodes is capable of accessing its own internal memory, as well as memory of the other nodes. In certain situations it becomes necessary to acquire a work area, such as a physical page, for the purpose of executing processing, in the storage area of a physical memory in one of a plurality of information processing apparatuses. If the work area is a common data area, used jointly (shared) by a plurality of processes, and cannot be acquired (e.g., if the number of free physical pages is below some threshold value), then an area which is not such a common data area, stored in that storage area, is exported (copied) to the storage area of the physical memory of another of the information processing apparatuses. As a result, the work area is obtained in the storage area newly produced by the exporting of the information previously stored there. When a local storage area or page cannot be acquired, and therefore a page must be exported, then preferably a physical page which has a low rate of use, and is not a common data area, is selected for export. In this way, a remote page may be used for areas for which the amount of cache coherence of maintenance information is small.

14 Claims, 3 Drawing Sheets

PROCESSING METHOD, APPARATUS AND SYSTEM FOR MEMORY MANAGEMENT USING SHARED MEMORIES WITH COMMON DATA AREAS

BACKGROUND OF THE INVENTION

This invention relates to an information processing system in which a plurality of information processing apparatuses, each having at least one processor, are interconnected via a line, wherein each information processing apparatus is capable of accessing an internal memory in each of the other information processing apparatuses. The invention further relates to such an information processing apparatus and to a method of using such an apparatus, as well as a method of controlling the system.

In an information processing apparatus connected by a communication line having a low transmission speed, such as a local area network ("LAN"), part of a physical memory incorporated in the information processing apparatus is acquired when a user program is generated and started up as a process. The process is run in the physical memory that has been acquired. Operating systems having a virtual storage mechanism have appeared in recent years. When the physical memory attempted to be acquired is inadequate, the contents of a physical page having a low rate of use are exported to a secondary memory accompanying the information processing apparatus or to another information processing apparatus, whereby a physical page is acquired in the physical memory of the information processing apparatus.

However, even if an information processing apparatus has an operating system possessing a virtual storage mechanism and the physical memory of another information processing apparatus on the communication line is empty, this physical memory cannot be utilized directly, though it can be utilized indirectly. The reason for this is that since the data transmission speed of the communication line is low, the hardware configuration adopted is not one that makes direct use of the physical memory of other information processing apparatuses.

However, a communication medium such as an optical cable that is reliable and has a performance somewhat close to that of the internal bus of the information processing apparatus has become available. By virtue of this medium, it is possible to adopt a configuration in which the physical memory of a certain information processing apparatus is utilized in another information processing apparatus directly. This makes it possible to provide a system in which any information processing apparatus is directly accessible.

Such an information processing system is one in which all of the memories (or parts thereof) provided in respective ones of the information processing apparatuses construct a single memory space, wherein the overall system is capable of operating in the manner of a NUMA (non-uniform memory access)-type multiprocessor system. In other words, this is a system capable of operating as a multiprocessor system because all of the information processing apparatuses in effect share a single memory, i.e., a certain information processing apparatus is capable of accessing its own memory at high speed and of accessing the memories of other information processing apparatuses but at reduced speed.

With such a system, a physical page of a physical memory in the other information processing apparatus can be secured and utilized directly if the physical memory of this other information processing apparatus is empty, even if the physical page of the physical memory in the information processing apparatus described above is not exported to its accompanying secondary memory or to the other information processing apparatus. (The physical memory utilized in the other information processing apparatus is referred to as a "remote page", and an information processing apparatus's own physical memory utilized thereby is referred to as a "local page".)

When the physical memory of an information processing apparatus in which a certain process is running is inadequate and the physical page of the physical memory in another information processing apparatus is acquired in the manner described above, the problem set forth below arises if the remote page is acquired indiscriminately without relation to the contents of the data to be stored in the physical page.

For example, assume a case where a certain information processing apparatus is part of a multiprocessor system, the process running in the apparatus is a multithread and a plurality of threads access a certain common data area jointly, or assume a case where a plurality of processes acquire a certain common data area and access the area jointly. If the common data area is cached in a plurality of processors, a large amount of cache maintenance information (address and control signals, etc.) will flow through the internal bus in order to maintain consistency. In other words, if a physical page which includes such a common data area is made a remote page, maintenance information comes and goes not only on the internal bus but also on the communication line connecting the information processing apparatuses. Since the efficiency of a communication line is lower than that of an internal bus, the result is a decline in the execution efficiency of the system.

SUMMARY OF THE INVENTION

An object of the present invention is to provide an information processing apparatus, method, system and method of controlling the same that make it possible to raise system execution efficiency by performing control in such a manner that a common data area used jointly by a plurality of processes is not stored in another information processing apparatus.

According to the present invention, the foregoing object is attained by providing an information processing apparatus, which includes at least one processor and has an internally provided memory, a plurality of which are interconnected via a line and are capable of accessing one another's memories, the information processing apparatus comprising monitoring means for monitoring the status of a storage area in the memory of the apparatus, discriminating means which, when it has become necessary to acquire a work area in the storage area, is for determining whether the work area is a common data area used jointly by a plurality of processes, exporting means which, when an output from the discriminating means indicates that the work area is a common data area and an output from the monitoring means indicates that the work area cannot be acquired in the storage area, is for exporting an area which is not a common data area stored in the storage area to any of the storage areas of the internally provided memories of the plurality of information processing apparatuses, and acquiring means for acquiring the work area in a storage area newly produced by the exporting means.

Further, according to the present invention, the foregoing object is attained by providing an information processing method through which a plurality of lineconnected information processing apparatuses, each of which includes at least one processor and has an internally provided memory, are capable of accessing one another's memories, the information processing method comprising a monitoring step of monitoring the status of a storage area in the memory of the apparatus, a discriminating step which, when it has become necessary to acquire a work area in the storage area, is a step of determining whether the work area is a common data area used jointly by a plurality of processes, an exporting step which, when a result obtained at the discriminating step indicates that the work area is a common data area and a result obtained at the monitoring step indicates that the work area cannot be acquired in the storage area, is a step of exporting an area which is not a common data area stored in the storage area to any of the storage areas of the internal memories of the plurality of information processing apparatuses, and an acquiring step of acquiring the work area in a storage area newly produced at the exporting step.

Further, according to the present invention, the foregoing object is attained by providing an information processing system in which a plurality of information processing apparatuses each having an internally provided memory are interconnected by a line and are capable of accessing one another's memories, the information processing system comprising monitoring means for monitoring the status of a storage area in the memory of each information processing apparatus, discriminating means which, when it has become necessary to acquire a work area in the storage area of the memory of one of the plurality of information processing apparatuses, is for determining whether the work area is a common data area used jointly by a plurality of processes, exporting means which, when an output from the discriminating means indicates that the work area is a common data area and an output from the monitoring means indicates that the work area cannot be acquired in the storage area, is for exporting an area which is not a common data area stored in the storage area to any of the storage areas of the internally provided memories of the plurality of information processing apparatuses, and acquiring means for acquiring the work area in a storage area of the apparatus newly produced by the exporting means.

Further, according to the present invention, the foregoing object is attained by providing a method of controlling an information processing system in which a plurality of information processing apparatuses each having an internally provided memory are interconnected by a line and are capable of accessing one another's memories, the method comprising a monitoring step of monitoring the status of a storage area in the memory of each information processing apparatus, a discriminating step which, when it has become necessary to acquire a work area in the storage area of the memory of one of the plurality of information processing apparatuses, is a step of determining whether the work area is a common data area used jointly by a plurality of processes, an exporting step which, when a result obtained at the discriminating step indicates that the work area is a common data area and a result obtained at the monitoring step indicates that the work area cannot be acquired in the storage area, is a step of exporting an area which is not a common data area stored in the storage area to any of the storage areas of the internally provided memories of the plurality of information processing apparatuses, and an acquiring step of acquiring the work area in a storage area of the apparatus newly produced at the exporting step.

Thus, if, when it becomes necessary to acquire a work area, which is for the purpose of executing processing, in the storage area of a memory, the work area is a common data area used jointly by a plurality of processes and cannot be acquired in the abovementioned storage area, an area which is not a common data area stored in the above-mentioned storage area is exported to the storage area of the memory in another information processing apparatus in order to acquire the work area in this storage area. As a result, the work area is obtained in the storage area newly produced by export.

It should be apparent from the foregoing description that the present invention makes it possible to provide an information processing apparatus, method, system and method of controlling the same that make it possible to raise system execution efficiency by performing control in such a manner that a common data area used jointly by a plurality of processes is not stored in another information processing apparatus.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENT

The preferred embodiment of the present invention will now be described in detail in accordance with the accompanying drawings.

Figure 1:
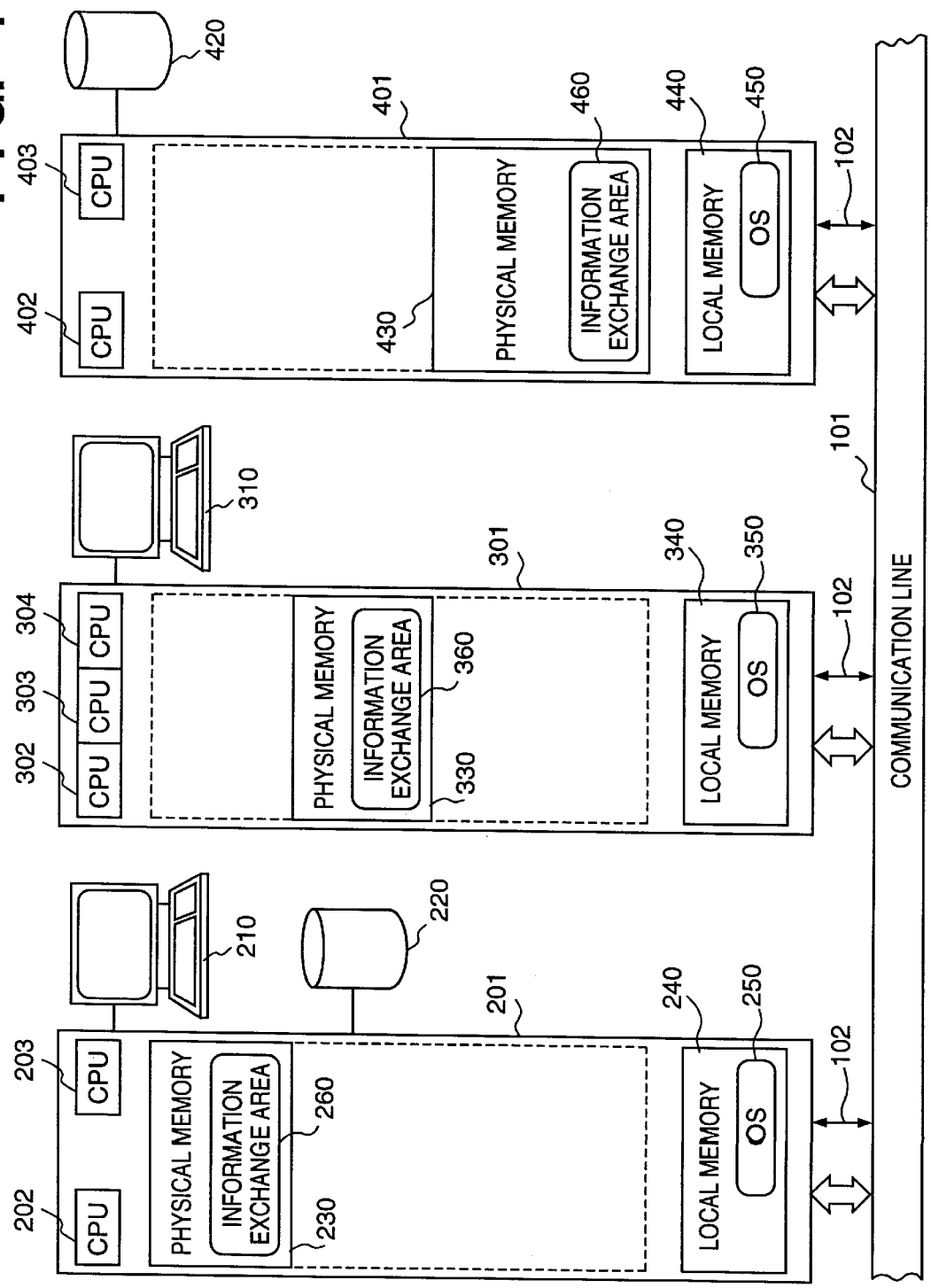
FIG. 1 is a block diagram illustrating the architecture of an information processing system embodying the present invention.

FIG. 1 is a block diagram illustrating the architecture of an information processing system embodying the present invention.

As shown in FIG. 1, the system includes a communication line 101 such as an optical network capable of transmitting data at high speed, and information processing apparatuses 201, 301 and 401 interconnected by the communication line 101.

The information processing apparatuses are provided with one or more central processing units ("CPUs"). More specifically, the information processing apparatuses 201, 301 and 401 are provided with CPUs 202, 203; 302, 303, 304; and 402, 403; respectively, each of which is, internally provided with an MMU (hot shown) and a cache memory (not shown). Further, the CPUs are so adapted as to be capable of mutually accessing physical memories 230, 330, 430. However, the arrangement generally adopted is one in which the CPU that accesses the memory of a certain information processing apparatus accesses its own physical memory more rapidly than it accesses the physical memory of another information processing apparatus because the communication line 101 does not intervene in the former memory access.

It is assumed here that the cache scheme of the cache memory is a copy-back scheme. This embodiment is for a case in which the cache memory is incorporated in the processor. However, this does not impose a limitation upon the invention. For example, it is readily possible to adopt a system architecture in which the cache memory is externally provided.

The system further includes user interfaces 210, 310. Each user interface has a display and an interface. The information processing apparatuses 201 and 401 are coupled to secondary storage units 220, 420, respectively, each of which comprises a hard disk or the like. Each secondary storage unit stores read-only data such as text data or initialization data.

It should be noted that the information processing apparatuses need not be coupled to the user interfaces 210, 310 and secondary storage units 220, 420. For example, the information processing apparatus 401, which is not coupled to a user interface, is utilized as a server machine or as a processor pool.

Numeral 102 denotes a CPU-CPU interrupt mechanism which allows asynchronous communication to be performed between the operating systems (OSs) being run by the information processing apparatuses.

The physical memories 230, 330, 430 of the information processing apparatuses 201, 301, 401 together constitute a single memory space. Numerals 240, 340, 440 denote local memories of the information processing apparatuses 201, 301, 401, respectively. The local memories 240, 340, 440 store the operating systems 250, 350, 450, respectively. However, since it is possible to store the operating systems in parts of storage areas of the physical memories 230, 330, 430, whether a local memory is provided or not does hinder the application of the present invention.

In this embodiment, each of the operating systems 250, 350, 450 carries out scheduling and virtual storage management of a plurality of CPUS. Further, it is assumed that system information in the information processing apparatuses, namely information such as that indicating the particular physical address of a physical memory of a particular information processing apparatus, is capable of being ascertained each of the operating systems. Further, the operating systems are such that systems having substantially the same functions operate in each of the information processing apparatuses and work in cooperation with one another. As a result, the independence of each information processing apparatus is enhanced and so is overall system-flexibility.

Furthermore, it does not matter whether the operating systems 250, 350, 450 are run in the local memories 240, 340, 440 or in the physical memories 230, 330, 430 of the information processing apparatuses. However, since part of the data area of each of the operating systems 250, 350, 450 is for making the memory management information or process scheduling information managed by each operating system exchangeable, these data areas are placed in information exchange areas 260, 360, 460 of the physical memories 230, 330, 430.

Further, the operating systems 250, 350, 450 are capable of grasping information indicating where in virtual memory space each area possessed by a process is located as well as the nature of each area. By the "nature" of an area is meant whether the area of a physical page in the physical memory is (a) capable of being written to or not and (b) capable of being shared by threads or processes or not. In terms of areas, processes in systems may comprise:

(1) A text area (read-only/shared)
   . . . a program code area
(2) An initialization data area (read-only/shared)
   . . . an area in which character strings and constants, etc., are loaded and initialized
(3) A non-initialization data area (write/shared)
   . . . an area for a global variable of initial value zero, etc.
(4) A heap area (write/shared)
   . . . an area for a dynamically extendible global variable, etc.
(5) A stack area (write/no sharing)
   . . . an area for a local stack of threads Further, there is also a system in which an area capable of being shared by processes can be registered and utilized upon distinguishing the type, i.e., read-only or write. Accordingly, one also has the following:

(6) An area shared by processes (read-only/shared);
(7) An area shared by processes (write/shared).

When a (write/shared) area from among these areas is cached in the cache memory of each processor in a multi-processor system, a large quantity of cache maintenance information flows in order to maintain consistency. Such an area shall be referred to as a common data area.

Areas capable of becoming common data areas are area types (3), (4) and (7) in the example cited above. However, since an area is not cached in a plurality of processors unless the process is a multithread, the area types (3) and (4) cannot be common data areas. Accordingly, the areas (3) and (4) can be treated as common data areas only in the case of a multithread or unless the operating system is capable of ascertaining beforehand that a process will generate a plurality of threads and become a multithread (in a case where the operating system is capable of making such a determination).

In order for the operating system to become aware of this information, it is possible to perform programming explicitly in such a manner that the process itself informs the operating system, as by a system call or the like, as to whether it will or will not become a multithread. If the operating system is incapable of ascertaining such information, the areas of types (3) and (4) are treated as common data areas.

Further, even if the areas of types (3) and (4) have been determined to be common data areas in the manner described above, there are instances where only portions of such areas are actually common data areas. In such case, the user performs programming so as, to explicitly notify the operating system (as by a system call) of the fact that the area is to be made a common data area. By this means, the operating system will be capable of discriminating a more limited area as the common data area.

Further, it is possible for such notification to be given to the operating system automatically by programming language specifications and the system of processing thereof. In such case, the user employs reserved words of the programming language-to define, in the form of a declaration, the fact that a certain area is a common data area.

Thus, as described above, an operating system internally stores (in the operating systems 250, 350, 450) information indicating which areas among the various areas that constitute each process are common data areas and which are not common data areas.

Figure 2:
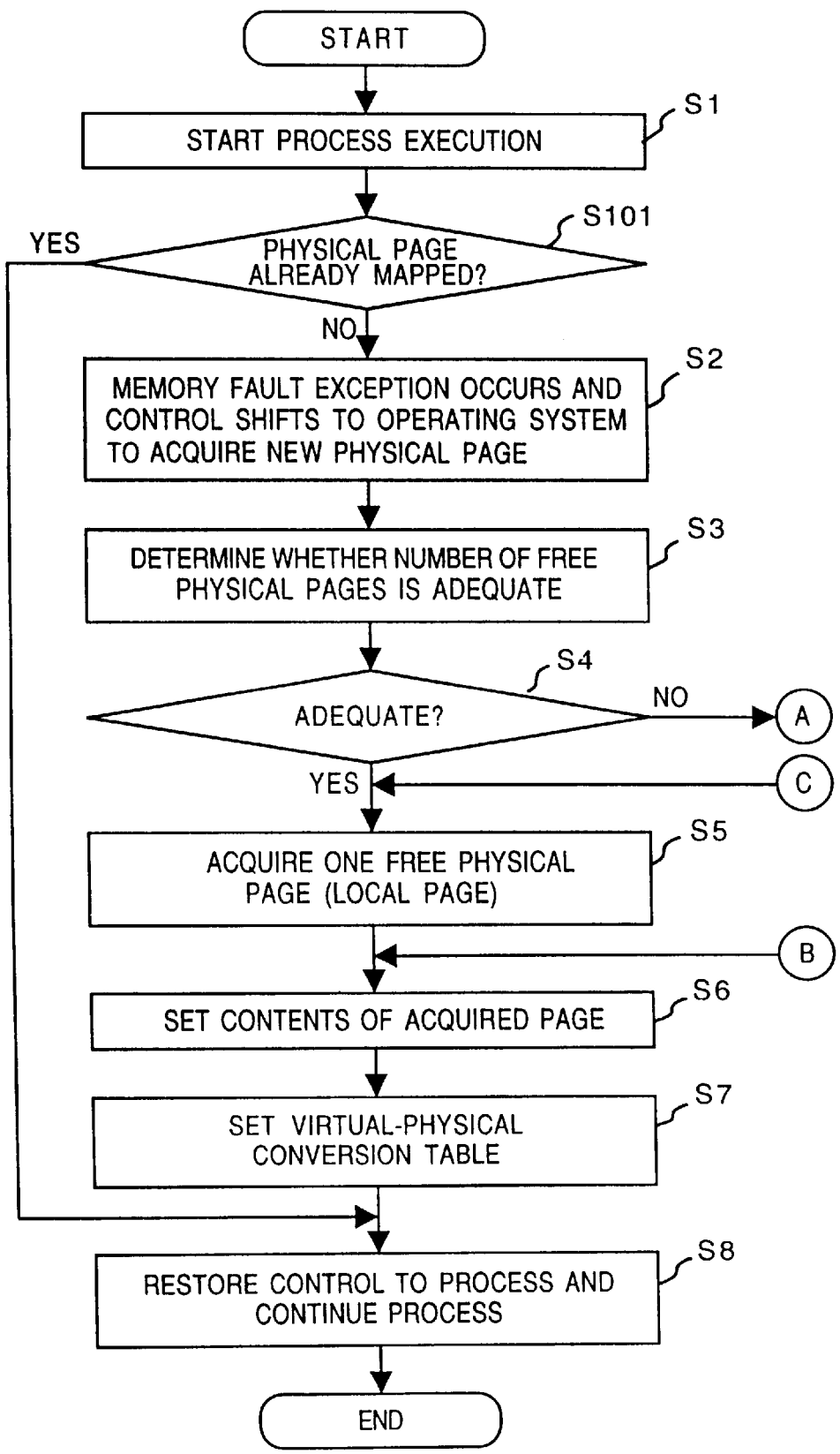
FIGS. 2 and 3 are flowcharts illustrating the processing flow embodying the present invention.

The processing flow of this information in the information processing system will now be described using the flowcharts of FIGS. 2 and 3.

A process generated by, say, the CPU 202 of information processing apparatus 201 starts being executed at step Sl. This is followed by step S101, at which the process operating in virtual space accesses a certain virtual address. Here it is determined whether a physical page has already been mapped at the accessed virtual address (i.e., whether a physical page has been obtained and its contents established and whether the contents have been set in a virtual physical conversion table). If the physical page has already been mapped ("YES" at step S101), then the program proceeds to step S8. If the physical page has not been mapped ("NO" at step S101), then the program proceeds to step S2.

It should be noted that the virtual-physical conversion table is a conversion table for converting a virtual address to a physical address. A combination of a new virtual address and physical address is set in the virtual-physical conversion table whenever mapping is performed.

A memory fault exception occurs and control shifts to the operating system 250 in order to acquire a new physical page at step S2.

Next, at step S3, the operating system 250 examines (or monitors) the number of free physical page in the physical memory 230 (the number of physical pages not currently being used) and determines whether the number of pages is adequate. As for the criterion used in making this judgment, a figure such as 5% of the total number of physical pages present in the physical memory is set as a threshold value. If the number of free physical pages exceeds this set threshold value, then the number is "adequate"; otherwise, the number is considered inadequate. In a case where the number of physical pages in the physical memory 230 is adequate ("EYES" at step S4), the program proceeds to step S5. If the number is inadequate ("NO" at step S4), then the program proceeds to step S10 (FIG. 3).

The operating system 250 acquires one free physical page of the physical memory 230 in the information processing apparatus 201 at step S5.

The contents of the acquired physical page are set at step S6. The method is as follows: On the basis of the virtual address at which the memory fault exception occurred, the position of the page in the virtual address space which includes this virtual address is calculated, and the contents corresponding to this position are set in the physical page. For example, in a case where the set contents are part of a text area of initialization data area, the contents will have been stored in the secondary storage unit 220. Accordingly, the contents are read out of the secondary storage unit 220 and copied to the physical page that has been acquired. If the set contents are part of a non-initialization data area, then the physical page acquired is initialized to zero.

When setting of the contents of the acquired physical page is finished, information for effecting a conversion from the address (virtual address) of the page including the virtual address location at which the memory fault exception occurred to the address (physical address) of the acquired physical page is set in the virtual-physical conversion table at step S7.

Next, at step S8, control returns from the operating system 250 to the process and a physical page is acquired on demand. Execution of the process is resumed using the physical page that has been acquired.

The foregoing is the flow of processing in a case where the number of free physical pages is adequate (this is similar to ordinary demand paging). Processing for a case where the number of free physical pages is inadequate will be described next.

Figure 3:
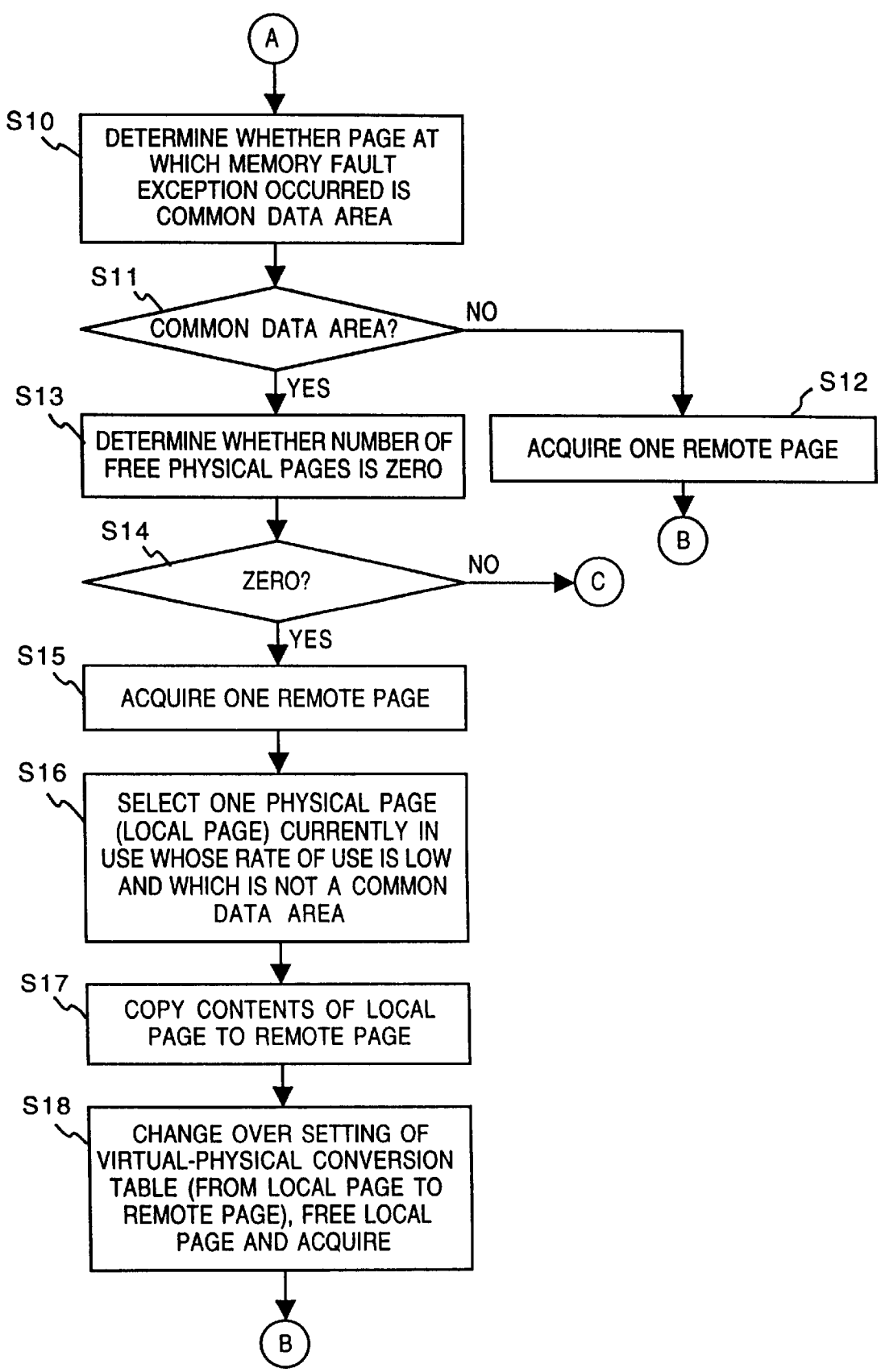

If it is determined (or discriminated) at step S4 (FIG. 2) that the number of free physical pages is inadequate ("NO" at step S4), then the program proceeds to step S10 (FIG. 3). Here the position of a page which include the virtual address at which the memory fault exception occurred is calculated, and it is determined whether this page is a common data area. This determination is male based upon the information of each area of the process already possessed internally of the operating system 250.

If the area is a common data area ("YES" at step S11), then the program proceeds to step S13. If the area is a not common data area ("NO' at step S11), then the program proceeds to step S12.

A remote page is obtained from the information processing apparatus 301 or 401, which are connected by the communication line 101, at step S12.

First, the number of free physical pages in an information processing apparatus other than the information processing apparatus 201, i.e., in information processing apparatus 301 or 401, is examined and the information processing apparatus having the larger number of free physical pages is selected. This can be implemented by having the operating systems 250, 350, 450 constantly store information about their own numbers of free physical pages at locations that have been decided in their information exchange areas 260, 360, 460, respectively, and having the operating systems 250, 350, 450 read out the information from the information exchange areas 260, 360, 460 when necessary.

Next, a remote page is acquired from the information processing apparatus that has been selected. For example, assume that the information processing apparatus 401 has been selected. First, in order for the operating system 250 of the information processing apparatus 201 to transmit information to the effect-that a physical page has become necessary from the physical memory 430 of information processing apparatus 401 to the operating system 450 of the information processing apparatus 401, the operating system 250 writes in the information by utilizing the information exchange area 260 or 460. The operating system 250 uses the CPU-CPU interrupt mechanism 102 to call the operating system 450 of the information processing apparatus 401 asynchronously and waits until results arrive. It does not matter if the process is assigned to another CPU during this waiting time.

Meanwhile, the called operating system 450 of the information processing apparatusl4ol acquires the physical page from the physical 4emory 430 in accordance with the information from the op rating system 250 of the information processing apparatus 201 and sets the internal state in such a manner that the acquired physical page is placed under the administration of the operating system 250. The information (physical address, etc.) relating to the acquired physical page is written in the information exchange area 260 or 460. Furthermore, the operating system 450 calls the operating system 250 asynchronous ly using the CPU-CPU interrupt mechanism 102 and hands over the physical page. The interrupted operating system 250 is released from the standby state and acquires the remote page.

If the remote page can be acquired, the program proceeds to step S6 (FIG. 2), where processing similar to that of ordinary demand paging is continued.

The number of free physical pages is checked at step S13 (FIG. 3). If the number of free physical pages is not zero, i.e., if a free physical page remains ("NO" at step S14), then the program proceeds to step S5. Here one free physical page of the physical memory 230 in the information processing apparatus 201 is acquired, the program proceeds to step S6 and processing similar to ordinary demand paging is continued.

If the number of free physical pages of the physical memory 230 is zero ("YES" at step S14), then the program proceeds to step S15, where a remote page is obtained from the information processing apparatus 301 or 401. The method of obtaining the remote page is as described above. Here the physical memory is obtained from the information processing 4pparatus 401.

From among the physical pages currently being used in the physical memory 230, a physical page whose rate of use is low and which is not a common data area is selected at step S16. A method of selecting a page having a low rate of use is to utilize an approximate LRU (least recently used) scheme employed in a conventional UNIX system or the like (UNIX is a trademark of Novell, Inc.).

Next, at step S17, the contents of the physical page of physical memory 230 selected at step S16 are copied (or exported) to the remote page of the information processing apparatus 401 acquired at step S15. When copying is finished, the program proceeds to step S18. Here, by changing over the setting of the virtual-physical conversion table of information processing apparatus 201, a change-over occurs from that which has been using the selected physical page up to now, in such a manner as to make use of the remote page of information processing apparatus 401. By virtue of this processing, the physical page of the selected physical memory 230 is freed and acquired. Next, on the basis of the freed physical page of physical memory 230, the program proceeds to step S6 and processing similar to ordinary demand paging is executed.

In accordance with this embodiment, as described above, execution of a process is advanced and an area for which the physical page has not yet been mapped is accessed. When a memory fault exception occurs, it is determined whether the number of free physical pages is adequate. If the number of free physical pages is inadequate, it is determined whether the area at which the memory fault exception occurred is a common data area. If the result of the determination is that the area is a common data area, a local page is acquired. Conversely, if the result of the determination is that the area is not a common data area, a remote page is obtained and appropriate contents are set, after which the virtual-physical conversion table is reset and execution of the process resumed.

In a case where it is determined that the area is a common data area but a local page could not be acquired because there were no free physical pages, a physical page which is currently being used but which has a low rate of use and is not a common data area is selected, and the contents of the selected physical page are copied to the remote page that has been acquired. The virtual-physical conversion table is reset, the page used is changed over to the remote page, and the resulting free local page is acquired, after which the foregoing processing is continued.

Accordingly, when it appears that a physical memory is inadequate, a local page, and not a remote page, is used with regard to a physical memory comprising areas that cause communication of a large quantity of cache maintenance information. On the other hand, a remote page is used with regard to a page comprising areas for which the amount of cache maintenance information is small. In other words, by changing the type of page used in a manner taking into account the nature of the memory area in question, the amount of information that flows on the communication line is reduced, and the execution efficiency of a process can be improved.

According to this embodiment, the cache scheme of the cache memory employs a copy-back method. However, this does not impose a limitation upon the invention. For example, a write-thru cache memory may be used. In such a case the memory-write information will flow on the bus unconditionally when a write operation occurs, even if a data area is not shared. Accordingly, with regard to an area in which a write operation occurs even though the area is not shared, the area is regarded as involving a large quantity of maintenance information and is treated as a common data area in the above-described embodiment. This makes it possible to raise the execution efficiency of the system.

The present invention can be applied to a system constituted by a plurality of devices (e.g., a host computer, interface, reader, printer, etc.) or to an apparatus comprising a single device (e.g., a copier or facsimile machine, etc.), as in the foregoing embodiment.

Further, it goes without saying that the object of the present invention can also be achieved by providing a storage medium storing the program codes of the software for performing the aforesaid functions of the embodiments to a system or an apparatus, reading the program codes with a computer (e.g., a CPU or MPU) of the system or apparatus from the storage medium, then executing the program.

In this case, the program codes read from the storage medium realize the above-described functions of the preferred embodiment, and the storage medium storing the program codes constitutes one aspect of the invention.

Further, the storage medium, such as a floppy disk, hard disk, optical disk, magneto-optical disk, CD-ROM, CD-R, magnetic tape, non-volatile type memory card or ROM can be used to provide the program codes.

Furthermore, besides the case where the aforesaid functions according to the embodiment are implemented by executing the program codes read by a computer, the present invention covers a case where an operating system (OS) or the like working on the computer performs a part of or the entire process in accordance with the designation of program codes and implements the functions according to the embodiments.

Furthermore, the present invention further covers a case where, after the program codes read from the storage medium are written in a function extension card inserted into the computer or in a memory provided in a function extension unit connecte4 to the computer, a CPU or the like contained in the function extension card or function extension unit performs a part of or the entire process in accordance with the designation of program codes and implements the above-described functions of the preferred embodiment.

The present invention is not limited to the above embodiment, and various changes and modifications can be made within the spirit and scope of the present invention. Therefore, to apprise the public of the scope of the present invention, the following claims are made.

What is claimed is:

1. A first computer node having at least one processor and an internal memory, connectable to a plurality of other computer nodes via a communication line, said first computer node being capable of accessing an internal memory in each of the other computer nodes, wherein all of the internal memories provided, respectively, in all of the computer nodes constitute a single memory space, and said first computer node is capable of operating in the manner of a NUMA (non-uniform memory access)-type multiprocessor system, said first computer node comprising:

monitoring means for monitoring the amount of free storage area of a storage area in its internal memory;

discriminating means for, when it has become necessary to acquire a new work area in the storage area, determining whether or not a current work area is a common data area used jointly by a plurality of processes;

exporting means for, when said discriminating means discriminates that the current work area is a common data area and said monitoring means determines that the new work area cannot be acquired in the storage area because of the amount of free storage area in the storage area is inadequate, exporting data of an area which is not a common data area in the storage area to another storage area of internal memories of the other computer nodes; and acquiring means for acquiring the new work area in a free storage area newly produced in the storage area by said exporting means, wherein each of said means is implemented by said at least one processor.

2. The apparatus according to claim 1, wherein said exporting means exports said data of area which is not a common data area to whichever of said plurality of other computer nodes has the largest free storage area in its internal memory.

3. A method of controlling a first computer node having at least one processor and an internal memory, connectable to a plurality of other computer nodes via a communication line, said first computer node being capable of accessing an internal memory in each of the other computer nodes, wherein all of the internal memories provided respectively in all of the computer constitute a single memory space, and wherein said first computer node is capable of operating in the manner of a NUMA (non-uniform memory access)-type multiprocessor system, said method comprising:

a monitoring step of monitoring the amount of free storage area of a storage area in the internal memory of said first computer node;

a discriminating step of, when it has become necessary to acquire a new work area in the storage area, determining whether or not a current work area is a common data area used jointly by a plurality of processes;

an exporting step of, when it is discriminated in said discriminating step that the current work area is a common data area and monitored in said monitoring step that the new work area cannot be acquired in the storage area because of the amount of free storage area in the storage area is inadequate, exporting data of an area which is not a common data area in the storage area to another storage area of internal memories of said plurality of other computer nodes; and an acquiring step of acquiring the new work area in a free storage area newly produced at the exporting step, wherein each of said steps is performed by said at least one processor.

4. The method according to claim 3, wherein, during said exporting step, said data of the area which is not common data area is exported whichever of said plurality of other computer nodes has the largest free storage area in its internal memory.

5. The method according to claim 3, wherein, in performing said method, said plurality of processes are executed in parallel by a plurality of processors provided in said first computer node, or in said first computer node and any of said plurality of other computer nodes.

6. The method according to claim 3, wherein, in performing said method, said plurality of processes are executed in parallel by a single processor provided in said first computer node or any of said plurality of other computer nodes.

7. An information processing system including a plurality of computer nodes each having at least one processor and an internal memory each interconnected via a communication line, each of said computer nodes being capable of accessing an internal memory in each of the other computer nodes, wherein all of the internal memories provided respectively in all of said computer nodes constitute a single memory space, and said information processing system is capable of operating in the manner of a NUMA (non-uniform memory access)-type multiprocessor system, wherein each of said computer nodes has:
monitoring means for monitoring the amount of free storage area of a storage area in its internal memory;

discriminating means for, when it has become necessary to acquire a new work area in the storage area, determining whether or not a current work area is a common data area used jointly by a plurality of processes;

exporting means for, when said discriminating means discriminates that the current work area is a common data area and said monitoring means monitors that the new work area cannot be acquired in the storage area because of the amount of free storage area in the storage area is inadequate, exporting data of an area which is not a common data area in the storage area to another storage area of the internal memories of said plurality of other computer nodes;

acquiring means for acquiring the new work area in a free storage area newly produced in the storage area by said exporting means; and control means for controlling each of said computer nodes, each of said means being implemented by said computer nodes.

8. The system according to claim 7, wherein said exporting means exports said data of the area which is not a common data area to whichever of said plurality of other computer nodes has the largest free storage area in its internal memory.

9. A method of controlling an information processing system including a plurality of computer nodes each having at least one processor and an internal memory each interconnected via a communication line, each of said computer nodes being capable of accessing an internal memory in each of the other computer nodes, wherein all of the internal memories provided respectively in all of said computer nodes constitute a single memory space, and said information processing system is capable of operating in the manner of a NUMA (non-uniform memory access)-type multiprocessor system, wherein each of the computer nodes performs:
a monitoring step of monitoring the amount of free storage area of a storage area in its internal memory;

a discriminating step of, when it has become necessary to acquire a new work area in the storage area, determining whether or not a current work area is a common data area used jointly by a plurality of processes;

an exporting step of, when said discriminating step discriminates that the current work area is a common data area and said monitoring step monitors that the new work area cannot be acquired in the storage area because the amount of free storage area in the storage area is inadequate, exporting data of an area which is not a common data area, stored in the storage area, to another storage area of internal memories of said plurality of other computer nodes;

an acquiring step of acquiring the new work area in a free storage area newly produced at said exporting step; and a control step of controlling each of said computer nodes to implement each of said steps in said plurality of computer nodes.

10. The method according to claim 9, wherein, during said exporting step, said data of the area which is not a common data area is exported to whichever of said plurality of other computer nodes has the largest free storage area in its internal memory.

11. The method according to claim 9, wherein, in performing said method, said plurality of processes are executed in parallel by a plurality of processors provided in any of said plurality of computer nodes.

12. The method according to claim 9, wherein, in performing said method, said plurality of processes are executed in parallel by a single processor provided in any of said plurality of computer nodes.

13. A computer-readable medium storing executable program code for causing performance of a method of controlling a first computer node having at least one processor and an internal memory, connectable to a plurality of other computer nodes via a communication line, said first computer node being capable of accessing an internal memory in each of the other computer nodes, wherein all of the internal memories provided respectively in all of the computer nodes constitute a single memory space, and wherein said first computer node is capable of operating in the manner of a NUMA (non-uniform memory access)-type multiprocessor system, said method comprising:

a monitoring step of monitoring the amount of free storage area of a storage area in the internal memory of said first computer node;

a discriminating step of, when it has become necessary to acquire a new work area in the storage area, determining whether or not a current work area is a common data area used jointly by a plurality of processes;

an exporting step of, when it is discriminated in said discriminating step that the current work area is a common data area and monitored in said monitoring step that the new work area cannot be acquired in the storage area because the amount of free storage area in the storage area is inadequate, exporting data of an area which is not a common data area in the storage area to another storage area of internal memories of said plurality of other computer nodes; and an acquiring step of acquiring the new work area in a free storage area newly produced at the exporting step, wherein each of said steps is performed by said at least one processor.

14. A computer-readable medium storing executable program code for causing performance of a method of controlling an information processing system including a plurality of computer nodes each having at least one processor and an internal memory each interconnected via a communication line, each of said computer nodes being capable of accessing an internal memory in each of the other computer nodes, wherein all of the internal memories provided respectively in all of said computer nodes constitute a single memory space, and said information processing system is capable of operating in the manner of a NUMA (non-uniform memory access)-type multiprocessor system, wherein each of the computer nodes performs:

a monitoring step of monitoring the amount of free storage area of a storage area in its internal memory;

a discriminating step of, when it has become necessary to acquire a new work area in the storage area, determining whether or not a current work area is a common data area used jointly by a plurality of processes;

an exporting step of, when said discriminating step discriminates that the current work area is a common data area and said monitoring step monitors that the new work area cannot be acquired in the storage area because the amount of free storage area in the storage area is inadequate, exporting data of an area which is not a common data area, stored in the storage area, to another storage area of internal memories of said plurality of other computer nodes;

an acquiring step of acquiring the new work area in a free storage area newly produced at said exporting step; and a control step of controlling each of said computer nodes to implement each of said steps in said plurality of computer nodes.

* * * * *

UNITED STATES PATENT AND TRADEMARK OFFICE
CERTIFICATE OF CORRECTION

PATENT NO.   : 6,092,157
DATED        : July 18, 2000
INVENTOR(S)  : SHIGEO SUZUKI It is certified that error appears in the above-identified patent and that said Letters Patent is hereby corrected as shown below:

COLUMN 2

Line 66, "lineconnected" should read
    --line-connected--.

COLUMN 4

Line 1, "abovementioned" should read
    --above-mentioned--.

COLUMN 5

Line 30, "CPUS" should read --CPUs--.

COLUMN 7

Line 12, "page" should read --pages--; and
    Line 60, "include" should read --includes--.

COLUMN 8

Line 23, "effect-that" should read
    --effect that--;
    Line 35, "apparatus14ol" should read
    --apparatus 401--;

UNITED STATES PATENT AND TRADEMARK OFFICE
CERTIFICATE OF CORRECTION

PATENT NO.   : 6,092,157
DATED        : July 18, 2000
INVENTOR(S)  : SHIGEO SUZUKI It is certified that error appears in the above-identified patent and that said Letters Patent is hereby corrected as shown below:

COLUMN 8 (Contd.,)

Line 36, "4emory" should read --memory--;
Line 37, "op rating" should read --operating--;
Line 44, "asynchronous ly" should read --asynchronously--; and
Line 65, "4pparatus" should read --apparatus--.

COLUMN 10

Line 32, "connect4" should read --connected--.

Signed and Sealed this

Seventeenth Day of April, 2001

Attest:

NICHOLAS P. GODICI

Attesting Officer    Acting Director of the United States Patent and Trademark Office